C. T. DRIGGS.
AIR BRAKE HOSE.
APPLICATION FILED SEPT. 10, 1909.
964,004.
Patented July 12, 1910.
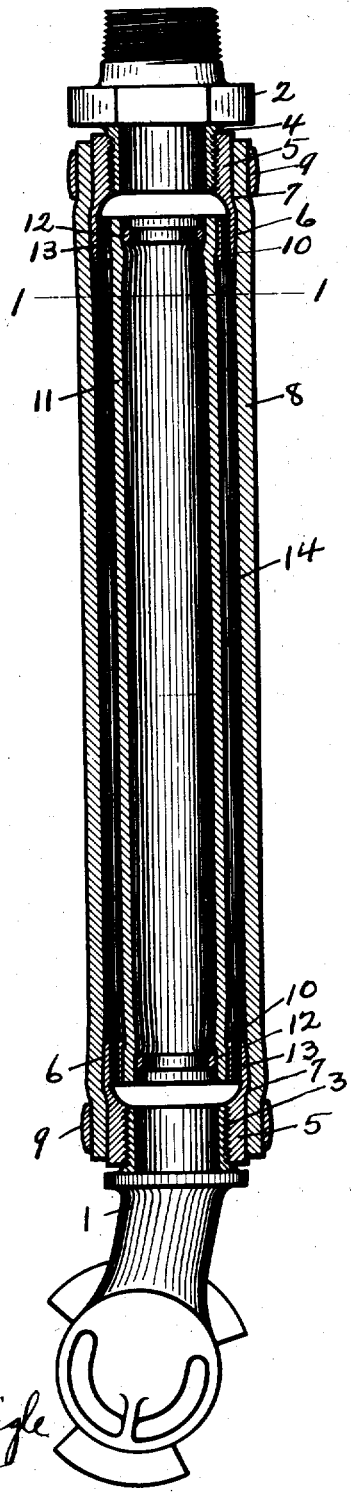
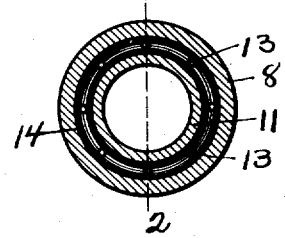
WITNESSES:
INVENTOR.
Charles T. Driggs
BY
ATTORNEY.

UNITED STATES PATENT OFFICE.

CHARLES T. DRIGGS, OF ERIE, PENNSYLVANIA.

AIR-BRAKE HOSE.

964,004.  Specification of Letters Patent.  Patented July 12, 1910.

Application filed September 10, 1909. Serial No. 517,046.

*To all whom it may concern:*

Be it known that I, CHARLES T. DRIGGS, a citizen of the United States, residing at Erie, in the county of Erie and State of Pennsylvania, have invented new and useful Improvements in Air-Brake Hose, of which the following is a specification.

This invention relates to air-brake hose, and consists in certain improvements in the construction thereof as will be hereinafter fully described and pointed out in the claim.

The object of the invention is to provide an air brake hose which, when broken, will not set the emergency brakes. It will be understood that when the ordinary air brake hose is broken or ruptured, the escape of air is ordinarily so rapid that the brakes are set, often causing damage and loss of life.

The invention is illustrated in the accompanying drawings as follows:

Figure 1 shows a section of the line 1—1 in Fig. 2; Fig. 2 a section of the line 2—2 in Fig. 1.

The drawing illustrates one section of an air brake hose.

1 marks the fitting by means of which the air brake hose of two different cars is connected, and 2 the fitting with which the hose is connected with the train pipe of the car. The fitting 1 has a screw thread projection 3, and the fitting 2 has a screw thread projection 4. The fittings 5 are screwed on these projections. The fitting 5 has an upwardly extending projection 6 forming a shoulder 7. An outer hose 8 is arranged over the projection 6, and extends beyond the shoulder 7 and is clamped on the fitting 5 by means of a band 9. The projection 6 has an internal shoulder 10 and the inner hose 11 extends within the projection 6 past the shoulder 10, and is secured therein by means of a ring 12 which is expanded within the hose. Perforations 13 extend longitudinally through the projection 6 connecting the space 14 between the hose, with the train air.

In normal use the inner hose 11 carries the air of the train line. The pressure on this inner hose, however, is balanced by reason of the fact that the train air passes through the perforations 13 to the space 14. The outer hose, therefore, is not only subjected to the wear of the elements but also carries the train pressure. When the outer hose is ruptured, the air of course escapes from the space 14 and through the perforations 13. The perforations 13 however are of such capacity that they will not accomplish the setting of the emergency brakes. They will however ordinarily accomplish the setting of the brakes. By this construction the inner hose which may be termed the safety hose, is at all times protected from wear and also relieved from the strain incident to train pipe pressure. On the other hand by having the space 14 connected with the air, indications are given of the rupture of the outer hose without such disastrous results as follow the rupturing of ordinary train pipe hose inasmuch as the connecting pressure in the train pipe as to set the prevent at least any such reduction in the passages are of such small capacity as to emergency brakes.

As indicated, my air brake hose is intended for use in combination with an air brake system in which the brakes are set by reduction of the train pipe pressure. With such apparatus pressure is normally maintained on the train pipe. With the reduction of pressure on the train pipe, each apparatus automatically permits the exhaust of air from it, thus setting the brakes. Where this exhaust of air is more rapid than normal, the emergency brakes are set, and where this occurs with the train under full speed, especially long freight trains, the train often doubles up, thus causing great injury to the cars, and often loss of life. With my construction, while the brakes are set with the rupture of the outer hose, the escape of air is controlled by the size of the perforations 13 which are of such size as to allow an escape of air equal in volume to the normal escape of air for setting the brakes. Thus, while the setting of the brakes is accomplished, the setting of the emergency brakes is prevented.

What I claim as new is:

The combination of an air brake system having a train line with air normally under pressure and arranged to apply the brakes with a reduction of such pressure; an air brake hose comprising an outer and an inner hose, the inner hose carrying the train air, and the outer hose forming a closure around the inner hose; and a connection for carrying the train air to the space between the hose, said connection being of small enough capacity to prevent the passage of sufficient air to set the emergency brake upon the bursting of said outer hose, and of sufficient capacity to accomplish the setting of the brakes upon the bursting of said outer hose.

In testimony whereof, I have hereunto set my hand in the presence of two subscribing witnesses.

CHARLES X T. DRIGGS.
his mark

Witnesses:
GUS M. DRIGGS,
CARLTON DRIGGS.

Correction in Letters Patent No. 964,004.

It is hereby certified that in Letters Patent No. 964,004, granted July 12, 1910, upon the application of Charles T. Driggs, of Erie, Pennsylvania, for an improvement in "Air-Brake Hose," an error appears in the printed specification requiring correction as follows: Page 1, lines 71 and 73 should be transposed; and that the said Letters Patent should be read with this correction therein that the same may conform to the record of the case in the Patent Office.

Signed and sealed this 16th day of August, A. D., 1910.

[SEAL.]

F. A. TENNANT,
*Acting Commissioner of Patents.* hose, said connection being of small enough capacity to prevent the passage of sufficient air to set the emergency brake upon the bursting of said outer hose, and of sufficient
5 capacity to accomplish the setting of the brakes upon the bursting of said outer hose.

In testimony whereof, I have hereunto set my hand in the presence of two subscribing witnesses.

CHARLES × T. DRIGGS.
his mark

Witnesses:
  Gus M. Driggs,
  Carlton Driggs.

---

Correction in Letters Patent No. 964,004.

It is hereby certified that in Letters Patent No. 964,004, granted July 12, 1910, upon the application of Charles T. Driggs, of Erie, Pennsylvania, for an improvement in "Air-Brake Hose," an error appears in the printed specification requiring correction as follows: Page 1, lines 71 and 73 should be transposed; and that the said Letters Patent should be read with this correction therein that the same may conform to the record of the case in the Patent Office.

Signed and sealed this 16th day of August, A. D., 1910.

[SEAL.]

F. A. TENNANT,
*Acting Commissioner of Patents.*

Correction in Letters Patent No. 964,004.

It is hereby certified that in Letters Patent No. 964,004, granted July 12, 1910, upon the application of Charles T. Driggs, of Erie, Pennsylvania, for an improvement in "Air-Brake Hose," an error appears in the printed specification requiring correction as follows: Page 1, lines 71 and 73 should be transposed; and that the said Letters Patent should be read with this correction therein that the same may conform to the record of the case in the Patent Office.

Signed and sealed this 16th day of August, A. D., 1910.

[SEAL.]

F. A. TENNANT,
*Acting Commissioner of Patents.*